US010964186B2

(12) United States Patent
Verma

(10) Patent No.: US 10,964,186 B2
(45) Date of Patent: Mar. 30, 2021

(54) WEB SERVER BASED 24/7 CARE MANAGEMENT SYSTEM FOR BETTER QUALITY OF LIFE TO ALZHEIMER, DEMENTIA,AUTISTIC AND ASSISTED LIVING PEOPLE USING ARTIFICIAL INTELLIGENT BASED SMART DEVICES

(71) Applicant: Shiv Prakash Verma, Cedar Knolls, NJ (US)

(72) Inventor: Shiv Prakash Verma, Cedar Knolls, NJ (US)

( * ) Notice: Subject to any disclaimer, the term of this patent is extended or adjusted under 35 U.S.C. 154(b) by 0 days.

(21) Appl. No.: 15/971,605

(22) Filed: May 4, 2018

(65) Prior Publication Data

US 2018/0253954 A1    Sep. 6, 2018

(51) Int. Cl.
*G08B 21/04*     (2006.01)
*G08B 21/02*     (2006.01)
(Continued)

(52) U.S. Cl.
CPC ............. *G08B 21/02* (2013.01); *G06F 3/017* (2013.01); *G08B 21/043* (2013.01);
(Continued)

(58) Field of Classification Search
CPC .. G08B 21/02; G08B 21/043; G08B 21/0469; G08B 21/0476; G08B 25/08;
(Continued)

(56) References Cited

U.S. PATENT DOCUMENTS 9,662,053 B2 *  5/2017  Richards ............ A61B 5/02427
9,854,206 B1 * 12/2017  Ren .......................... H04N 7/147
(Continued)

OTHER PUBLICATIONS

Rufo et al, Specification of U.S. Appl. No. 62/510,474, filed May 24, 2017.*
Rufo et al, Drawings of U.S. Appl. No. 62/510,474, filed May 24, 2017.*

*Primary Examiner* — Nay Tun

(57) ABSTRACT

A web server based system for 24/7 managed care services to clients with Alzheimer, Autism, and assisted living is provided in the invention. The system uses intelligent digital camera with built in AI algorithms to monitor client's activities, uses voice recognition, and two way voice communication and thus requires no body wearing devices. The camera detects client's movements—such as sitting, lying, and falls—and generates appropriate alarms to a central server for a client assistance operator to act. The smarts in the camera can analyze client's vicinity to pre stored scenes, client's emotion and generate alerts to the client assistant operator. The system uses an intelligent digital client assistant device with built in smarts for speaker independent voice recognition to provide client access to entertainment, e-commerce, and other voice activated services. The system in the invention uses a drone to monitor remotely movement of the client in case it leaves premises without informing a caregiver. The drone pilot monitors the movement and informs local authority to assist the client. The web server allows all managed care services needed to provide a good quality of life to the clients while monitoring their well-being and safety and relieves burden on the caregiver. The system in the invention allows clients remote virtual office visit to a physician, and monitors client's vehicle movement if client drives away from home. The system can also be used in other security related applications.

1 Claim, 8 Drawing Sheets

(51) Int. Cl.
  *G08B 25/08* (2006.01)
  *G08B 25/10* (2006.01)
  *G06F 3/01* (2006.01)
  *G08B 29/18* (2006.01)
  *G08B 25/01* (2006.01)
  *G08B 17/12* (2006.01)
  *G08B 21/20* (2006.01)

(52) U.S. Cl.
  CPC ..... *G08B 21/0469* (2013.01); *G08B 21/0476* (2013.01); *G08B 25/08* (2013.01); *G08B 25/10* (2013.01); *G06F 2203/011* (2013.01); *G08B 17/125* (2013.01); *G08B 21/0492* (2013.01); *G08B 21/20* (2013.01); *G08B 25/016* (2013.01); *G08B 29/183* (2013.01); *G08B 29/188* (2013.01)

(58) Field of Classification Search
  CPC .. G08B 25/10; G08B 17/125; G08B 21/0492; G08B 21/20; G08B 25/016; G08B 29/183; G08B 29/188; G06F 3/017; G06F 2203/011
  See application file for complete search history.

(56) References Cited

U.S. PATENT DOCUMENTS

| | | | |
|---|---|---|---|
| 10,140,987 B2* | 11/2018 | Erickson | G05D 1/0016 |
| 10,255,670 B1* | 4/2019 | Wu | H04N 5/2252 |
| 2004/0186813 A1* | 9/2004 | Tedesco | G06K 9/00624 |
| | | | 706/14 |
| 2004/0190767 A1* | 9/2004 | Tedesco | G08B 13/19641 |
| | | | 382/156 |
| 2007/0120996 A1* | 5/2007 | Boillot | G06F 3/017 |
| | | | 348/345 |
| 2016/0232774 A1* | 8/2016 | Noland | G08B 13/1672 |
| 2017/0092109 A1* | 3/2017 | Trundle | B64D 47/04 |
| 2017/0227965 A1* | 8/2017 | Decenzo | H04L 67/125 |
| 2017/0301200 A1* | 10/2017 | Siminoff | G08B 13/196 |
| 2018/0189661 A1* | 7/2018 | Tatourian | H04W 4/029 |
| 2018/0263220 A1* | 9/2018 | Schab | A01K 29/005 |
| 2018/0342329 A1* | 11/2018 | Rufo | G16H 40/67 |
| 2019/0245712 A1* | 8/2019 | Yu | H04L 12/4625 |
| 2019/0304271 A1* | 10/2019 | Yu | G08B 13/19632 |

* cited by examiner

CLIENT MANAGED SERVICES

- CALENDER MANAGEMENT
- DAILY ROUTINE PROFILE MANAGEMENT
- PHYSICAL TRACK MGMT.
- EMOTIONAL STATE MANAGEMENT
- NUTRITIONAL MANAGEMENT
- HOUSEHOLD CARE MANAGEMENT
- CAREGIVER MANAGEMENT
- FAMILY SUPPORT MANAGEMENT
- HEALTHCARE MANAGEMENT
- MEDICATION MANAGEMENT
- ENTERTAINMENT MANAGEMENT
- CLIENT TRANSPORT MANAGEMENT
- HOUSEHOLD MANAGEMENT – BILLS etc
- CONNECTION MANAGEMENT TO OTHER E-COMMERCE SERVICES LIKE –AMAZON, APPLE, GOOGLE
- FINANCIAL MANAGEMENT
- ALL ALERT MANAGEMENT AND COMMUNICATIONS TO ER SERVICES

FIG.3

WEB SERVER BASED 24/7 CARE MANAGEMENT SYSTEM FOR BETTER QUALITY OF LIFE TO ALZHEIMER, DEMENTIA,AUTISTIC AND ASSISTED LIVING PEOPLE USING ARTIFICIAL INTELLIGENT BASED SMART DEVICES

BACKGROUND OF THE INVENTION

1. Field of Invention

This invention is in the area of quality of life improvements for people with Dementia (Alzheimer), Autistic, and assisted living. It allows these folks to live and maintain a quality of life in the community they have lived without wearing any device on their body. The system provides them all the services these people would need to live with their special needs and will reduce the cost as well as pressure on the caregivers, and family members.

The number of Americans living with Alzheimer's disease is growing—and growing fast. An estimated 5.5 million Americans of all ages have Alzheimer's diseases today. An estimated 5.3 million are age 65 and older and approximately 200,000 individuals are under 65 and have younger—onset Alzheimer's. Because of the increasing number of people age 65 and older in the United States, particularly the oldest-old, the number of new cases of Alzheimer's and other dementias is projected to soar. And every 66 seconds an American is diagnosed with Alzheimer's today and it is projected to be every 33 seconds in mid-century. And globally to date there are 6 million people living with dementia and by 2050 this number will have risen to 131.5 million.

The cost of giving care to these people is over $259 billion in US today. Medicare and Medicaid are expected to cover $175 billion or 67 percent and out of pocket spending is expected to be $56 billion. And this does not include the cost of 15.9 million family and friends provided 18.2 billion hours of unpaid assistance to these Alzheimer's and other dementia, a contribution to the nation, valued at $230.1 billion. And 35% of caregivers reported their health deteriorated compared to 19% giving care to seniors. Globally the Alzheimer care cost is going to reach one trillion dollars and mostly born by the governments. And in some countries it is going to exceed their GDP. And thus it requires a cost effective better solution. Autism Spectrum Disorder is the fastest-growing development disability in USA. And more than 3.5 million Americans were living with autism spectrum disorder in 2014. And it's growing at the rate of 6-15 percent each year. And Autism Services cost U.S. citizens more than $262 billion annually in 2014. And again it does not include the hour's family members and friends spend in taking care of needs of this population. And it is estimated that 1% of world population diagnosed for this disorder. The cost of caring for this population is growing for US and other countries, and thus needs cost effective better solution.

Currently there are around one million Americans living in assisted living communities. And more are choosing to live alone at home especially poor due to cost, and fear of social isolation with their loved ones and friends. And research indicates that a staggering numbers of seniors who should be getting assisted care are still living at home—in many cares alone. And Govt. funded Medicare and Medicaid in 2017 reported that it is spending more than $10 billion a year for assisted living services for more than 330,000 Medical Beneficiaries, an average of more than $30,000 a person. And States have no way to keep track of cases involving the abuse, neglect, exploitation or unexplained death of Medicaid beneficiary in assisted living facilities. And thus further need a solution to this problem.

European families are sending their loved one with Alzheimer's to places like Chiangmai, Thailand where they live in services offered by European doctors. It is hard on the patient and equally hard for their loved ones. Patient has to live in a land not familiar to them and forced to speak English through they may be Germans. It is sad to see this treatment for elderly population.

Netherlands has started a village in Weesep for Alzheimer patient to live without any boundary, but still it is a one way street far away from their known surroundings, communities, and loved ones. This treatment looks more like society sending their garbage to landfills of other countries. We are forgetting that these people who have given their past years of life and efforts to raise today's young and adult productive population and it is our filial, moral, and social responsibility to give them a warm, humane and loving care at their end stage of life journey.

Technology has always been the answer for issues facing our society until we find a real cure for these problems. The most of solutions proposed has been related to monitoring activities of these people by putting an arm, body or leg bracelet on them, like we do for criminals. And these solutions are only effective in monitoring their activities as long as they have these devices on them. And it is not assured that they will have these monitors on them all the times. We see every day 'Amber' alert signs indicating missing Alzheimer or Autistic person. Sometimes an autistic person missing and found dead, and assisted living person dead due to unknown causes. US patent number: US 2008/0139899A1, and US Pat. No.: 2010/0201573 A1 discuss some of the body born monitoring methods proposed. And all of them focus on the body born monitoring aspect of this problem.

In the present invention, the Web-based Server System with intelligent digital cameras, and intelligent digital client Assistant offers a solution to the total management of care for Alzheimer, Dementia, Autistic and assisted living population. The solution can be used for an individual living in the home alone, nursing homes, assisted living communities, and assisted living person living alone. It uses artificial intelligent engine based on 21st century technology with smart electronic devices with Web-server Technology to offer solution to offer graceful living to affected population of today and future, and provides great relief to caregivers.

BRIEF SUMMARY OF INVENTION

This invention is related to a web server based 24/7 care management system to provide managed care for people with dementia—Alzheimer, autism spectrum disorder, and assisted living folks living alone. And the system allows them to lead normal routine life without wearing any electronics monitoring devices on their body, manages their everyday needs while monitoring their safety, daily routines, medical needs, wellness, providing entertainment, transportation, billing and financial management and household needs and relieves the caregivers to lead their life. The system comprises of an intelligent digital camera, with night vision, and build in Artificial Intelligence based algorithms for face, age, emotion, movement, detection on the real time video, to monitor client 24/7, and to compare the video with pre stored images for hazards like fire, fall. The camera generates appropriate alerts and send these alert to the web server over wi-fi router to act. And camera has built in beam forming multiple microphones with speaker independent key word recognition—like help, hurt, fall etc, and multiplicity of smart speakers and multiple of this camera installed at various positions in the client's residence to actively monitor client's well-being. The system also has an intelligent digital assistant placed in the client's living area for the client to interact with the client assistance operators. The intelligent Digital Client Assistant has a digital camera for video conference, HDMI port for video streaming on the TV, wireless/IR for programming set top boxes, beam forming multiple microphone array for client to speak, with built in algorithm for speaker independent key words recognition like TV, CNN, Google, SIRI, ALEXA, and smart multiple speakers, gesture controller, Ethernet port to connect to router for broad band internet connectivity to the web server for client to interact with client assistance operator, and wifi to connect to other smart home devices.

The system in the invention uses a drone station with drone with its remote controller connected to web server, and controlled remotely by a remote drone pilot operator to monitor and follow the client if it leaves alone without a caregiver knowledge, and alert is generated by the camera to the server. The drone pilot alerts the police for assistance with the location and details of the client, and drone returns to home on pilot's command.

The invention has web server at the managed care service provider's location which consists of at least one of the following server: a server which handles secure communication with all the connected devices, all the application management of supported terminals, all the user authentication using face, age, finger print, password and one time password matching, video and voice conferencing, map display manager. The web server in the invention supports video and VR video streaming on clients demand, voice and text messaging, IVR, email, on line face, movements, emotion detection on incoming video streams, client's devices alert management, client's managed care services management, client billing, e-payment services for clients, billing to Federal and State and other insurance companies for services, and payments to other service provider to the client, and data analytic tools to proactively assess clients wellness using vast data gathered from the clients residences, and a database system to store, retrieve and archive all the data in the system. The system in the invention supports client and client's family smartphone applications to provide all information on the client activities and client related information, and an a terminal application for client assistance operators on service provider's premises or remote location to provide all the managed services to a client, terminal application for drone pilot operator to monitor, track client and summon police authority for assistance to the client.

The invention has a compact intelligent digital camera with multiplicity of functions with at AI based functions built in it. The camera has at least one digital CMOS camera with night vision and zoom lens capability to continuously monitor a client with built in AI algorithms to detect face, movement, emotion, movement of a client, and pre stored scene analysis for hazards to inform web server with the alert on these aspects. It has multiple MEMS microphones with digital signal processor with algorithms for beam forming and speaker independent keyword recognition such as fire, help, hurt, to intimate web server with alerts, and multiple smart speakers to speak with the client, wifi module to connect with the broadband router and a Bluetooth module to connect to other Bluetooth enabled devices. The camera has a built in barometric atmospheric pressure, humidity and temperature sensor to detect clients movement, room temperature and humidity to further enhance detection of flooding and fire, and built in SD card slot for storage, and a wi-fi unit for the camera to communicate with the web server, and USB port to load scenes and retrieve video streams locally. And a microcomputer with at least one core CPU, and with at least one core graphic co-processor with RAM and flash memory to store data, execute all the embedded firmware, communicate with the web server, and with ability to upgrade and download software remotely from a web server.

The intelligent digital client assistant of the invention has plurality of built in function with at least a digital camera, and a HDMI connector for video conference and TV programming view, a wireless and IR port with universal remote controller functions to control set top units and TV controls, a gesture controller, and Ethernet, Wi-Fi and Bluetooth units, and, a barometric atmosphere pressure sensor, a temperature and a humidity sensor. The digital assistant in the invention has a multiple MEMS microphones array with digital signal processor for beam forming and speaker independent key words recognition such as TV, CNN, Alexa, Siri, Google, etc, and an array of smart speakers for quality sound listening, and it has a microcomputer with at least one core CPU and one core graphic co-processor and RAM and FLASH memory with embedded firmware to control all the above devices, and to communicate with the web servers, control other smart home devices, and generate appropriate alerts and commands to the web server, and the firmware can be remotely upgraded, Bluetooth module and wi-fi module to connect other Bluetooth enabled health devices.

The intelligent digital camera of this invention allows monitoring of a patient or client activities without wearing any body wearable devices. The device with its AI based algorithms allows monitoring of a patient's or client's activities for vicinity to hazards like fire, lakes, canals, heat sources like stoves, and the device generates alerts to prevent clients from harms The camera of this invention has built in AI based algorithms to monitor clients movements, recognize face and age, identify positions like sitting, lying, and falls which assists in analyzing client's behavior and routine patterns to create customize program for the client. The camera in the invention with its pre stored scenes of food samples, can analyze client's eating habits to check for nutritional intake and client's food taste. The camera of the invention with its barometric sensor can be used to monitor clients eating habits and time of day food intake to understand client's habits. The camera mounted in the bathroom allows respective caregiver to understand client's hygiene habits and reflect on the client's mental and physical alertness.

The digital client assistant of this system provides client with all the entertainment services with the assistance of web-server of the invention using keyword recognition algorithms built in the device. It can also control all smart home devices and allows client access to other e-commerce and services websites like Amazon, Google and Apple with its beam forming speaker independent keywords recognition algorithm. The digital client assistant and the web server of the invention is used to provide client with all managed care services needed by the client, and these services are customized on the need bases, and preference based on the caregiver and family.

The drone of the invention with its remote controller controlled by the drone pilot operator terminal of the system server allows full surveillance of the patient if it leaves residence accidentally alone without a caregiver and is assisted by the authorities to reach home.

The system allows remote virtual office visit to a physician to check patient health on the need bases and supports a smart all electronic license plate mounted on the client's vehicle to monitor the vehicle if client drives alone without a caregiver accidentally.

BRIEF DESCRIPTION OF DRAWINGS

FIG. 3 List of the various managed care services provided by the system in the invention.

DETAILED DESCRIPTION OF THE INVENTION

Figure 1:
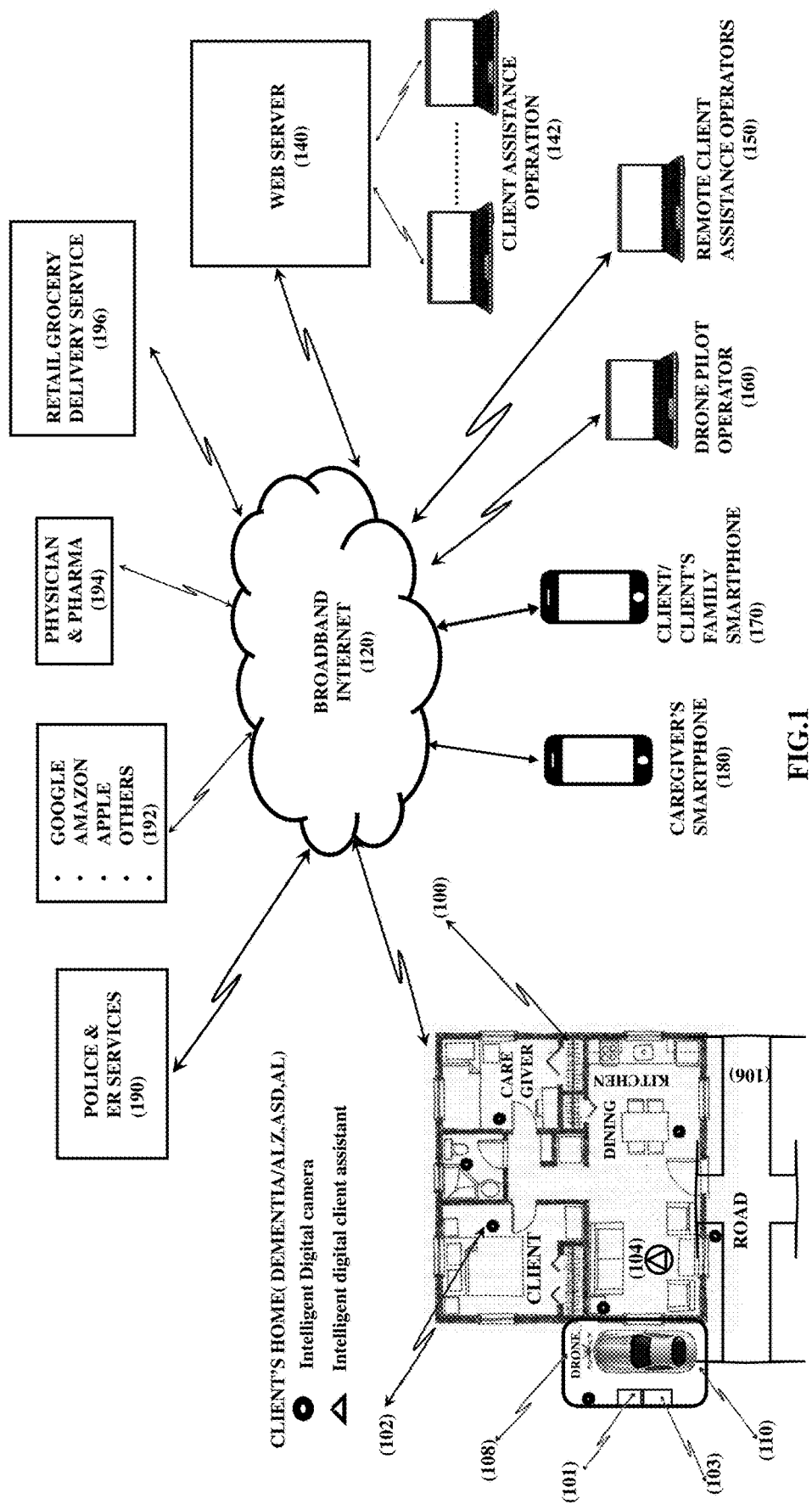
FIG. 1 Shows block diagram of the system in the invention. The intelligent digital cameras are placed in various locations of the premise to monitor client's movement and activities and with a drone on the drone station. An intelligent digital client assistant is placed in the living room. And a web server provides all the management functions needed in the managed services.

The FIG. 1 of the invention gives a block diagram of the system which allows a total 24/7 management of clients with Alzheimer/Dementia, Autism spectrum disorder, ASD, special needs citizens. The embodiment focuses mainly at the individual clients living at home alone, but equally applies to people living in nursing homes, assisted living communities.

Invention uses an intelligent digital camera, iDC (102), mounted in all the locations of the house (100) and outside premises, including backyard. The intelligent camera (102) has smarts to detect clients face from live video during day and night. It detects client's movements and can communicate with the client on two way voice. The iDC (102) has ability to detect client's position i.e. lying down, standing, sitting, and can detect fall. It is all the time in communication with the web-server (140) over the broadband internet (120), using wi-fi router (103). The intelligent camera, (102) has built in AI algorithms to detect fire, danger scenes like lake, canal etc. It will alert the server if the client is in danger, and near to these situations.

The camera (102) has built in AI algorithm to extract clients facial features to understand emotion state of the client. And this emotional state is used by the web server to design client's activities for the day. The camera's (102) beam forming microphone array with its own digital signal processor and it can understand voice recognition independent keywords, like-help, hurt, nurse, doctor, fire. And the web server (140) immediately triggers appropriate response to the camera alerts using client's alert management software. The range finding-feature of the camera also helps in alerting the web-server if client is approaching near a danger zone. The camera can time stamp client performing all the activities to analyze if it is normal or abnormal to generate an alert for the system to check client's well-being. The camera in the invention is preloaded with these scene based analytic alerts at the time of installation based on location, e.g. a camera in the kitchen will alert how many times client has opened the refrigerator a day to deduce eating habits as well as need to refill supplies. The humidity and temperature, sensor in the camera can check if the client has left a stove on. And the system will remind the client to act on these in a friendly manner or sound alert to the caregiver. The intelligent digital camera (102) can monitor client's specific activities in each room—bedroom, bathroom, kitchen, dining, and living room. This allows clients to lead a carefree normal life without being subjected to wearing any device attached to the body. And thus there is no need for client's to wear body monitoring device, thus eliminates necessity to tracking if they have device on or forgot to wear one. The system in the invention is always on guard to protect the client, and understand client's daily routines.

The intelligent digital client Assistant (iDCA), (104) allows a client to interact with web-server (140) using voice commands. The iDCA (104) is connected to the web-server (104) with an Ethernet port connected to a router (103). It has also wi-fi and Bluetooth connectivity for it to communicate with other smart home devices. A HDMI port allows it to connect to the client's TV to watch television programming. The iDCA (104) has a built in universal remote controller for it to control set-top boxes-like cable TV, Apple TV, Roku, and others. The beam forming microphone array with DSP in iDCA (104) allows keyword speaker independent voice recognition up to five meters from the device. The web management application can interact through iDCA (104) to ask the client what programs the client wants to watch, and then program the universal remote for the appropriate channel on the appropriate set-top unit. This information on channel number is stored in the web-server under the client entertainment list. The iDCA (104) in the invention can control the input ports of the TV through its remote port, and through the internet if it's connected to a smart TV. The iDCA (104) of the invention can understand the words like google, Siri, Alexa for it to connect client to these servers to use their services. The client can ask iDCA (104) to stream on the TV, personal video stored on the server (140). The motivational videos of their family living or departed talking to them, and their own videos can enhance their moods, and can boost their moral. These videos can be in augmented with a VR mode for them to feel presence of their loved ones with them. The iDCA (104) has a built in digital camera in the front. The iDCA (104) of the invention with its own front camera allows a client to talk to their loved one's on video conference with the live video shown on the TV screen. The invention has built in smart speakers to direct high quality sound to the client. The iDCA (104) can connect to other wi-fi and Bluetooth devices used in the client's home (100). The iDCA (104) supports a gesture based communication for clients with inability to speak.

The web-server (140) in the invention provides all the client alert management functions to the caregiver, and client's family using client's caregiver applications running on the smartphone, (170)(180). It also handles all the applications running on the Laptop/tablet/smartphone of all of client Assistant operators (142), (150). The web server (140) also handles all client care communications. It also handles finger print recognition, Password and OTP to handle server's access to caregivers, family members, client assistance operators. The web-server (140) is always running a map based application to identify the client, residence location, emergency contact numbers of the family members, their email addresses, phone numbers of the ER services, local hospital, and police. The server in the invention provides on line face and emotion detection to assess the client's mental makeup to modify program for the day. The server (140) in the invention handles all the client services, client billing, e-payment services for client, and billing to insurance companies, Federal & State agencies for services. It uses data analytic tools using client information from the intelligent client assistant, iDCA, (104) and client activity tracker to assess proactively adjustment of care, medical attention for the client. The system operator can schedule virtual remote doctor's visit to a primary care provider (144), or a specialist, as per US patent pending application filed no: 2018/15880530. The client's car is fitted with a smart electric license plate (110) which allows the system in invention to monitor the client location, and assist with any help to the client as per US patent pending application no: 2017/15831350. The server (140) can communicate with police (190), e-commerce platforms (192), local pharmacy (194), and retail stores (196). If a client with severe dementia, Alzheimer or Autism walks away from home without caregiver's knowledge, and Web-server (140) gets an immediate alert from the intelligent camera. The client Assistant operator (142) immediately uses a Drone (108) to monitor the client movement with the assistance of Drone Pilot Operator (160). Drone has built in face recognition, and it can follow the client in a selfie mode or track mode, and it streams video as well as GPS location information of the client to the drone pilot operator (160). Once the police reach to assist the client, the drone operator can command the drone to return to home station. The drone (108) provides another missing link to provide security and care to the clients, and peace of mind to client's family and caregivers. The web-server (140) Drone Manager allows the Drone Operator (160) to control the remote controller (101) of client Drone (108).

The caregiver Apps (180) allows the caregiver to send any alerts to the server assistance operator (142) regarding the client managed care. It can have a video/voice conference with the client's family, and system's assistance operator (142). The system Assistance Operator (142) will schedule all the services for the client. It manages all client related services such as medical schedule, food and nutrition intake and resupplies, household care & supplies, etc. Family/client App (170)(180) on the smartphone allows able clients to use the system services, video conference with family, online services etc.

Figure 2:
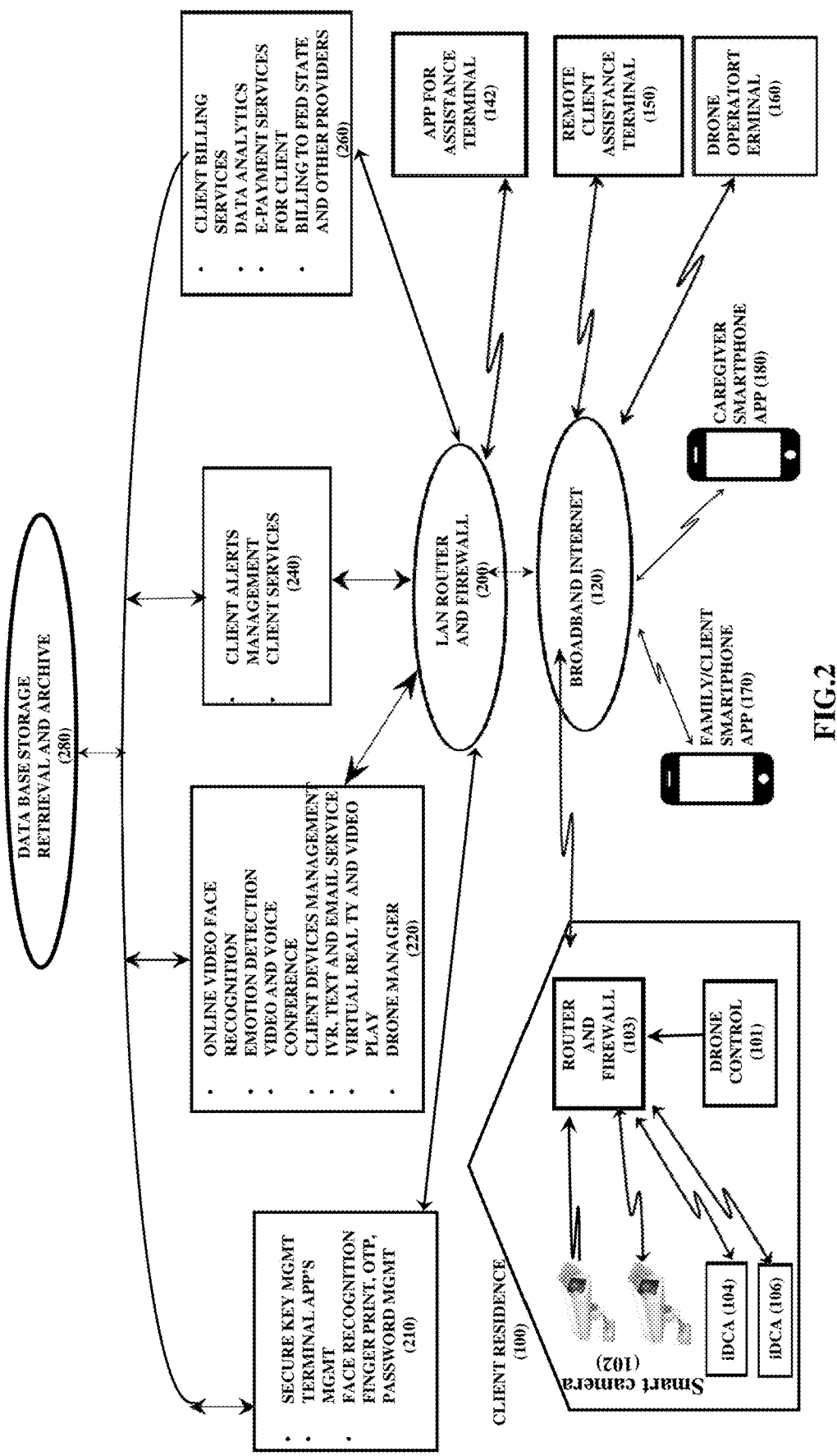
FIG. 2 Various functions of the invention and their connectivity.

The FIG. 2 of the invention gives details of the web-server (140) and various applications running on the server. And show connectivity between the devices at client Residence with broadband internet. Client Assistance terminal (142), (150) (160) can be co-located or distributed at various remote locations. And all are managed by the terminal handling application.

Figure 4:
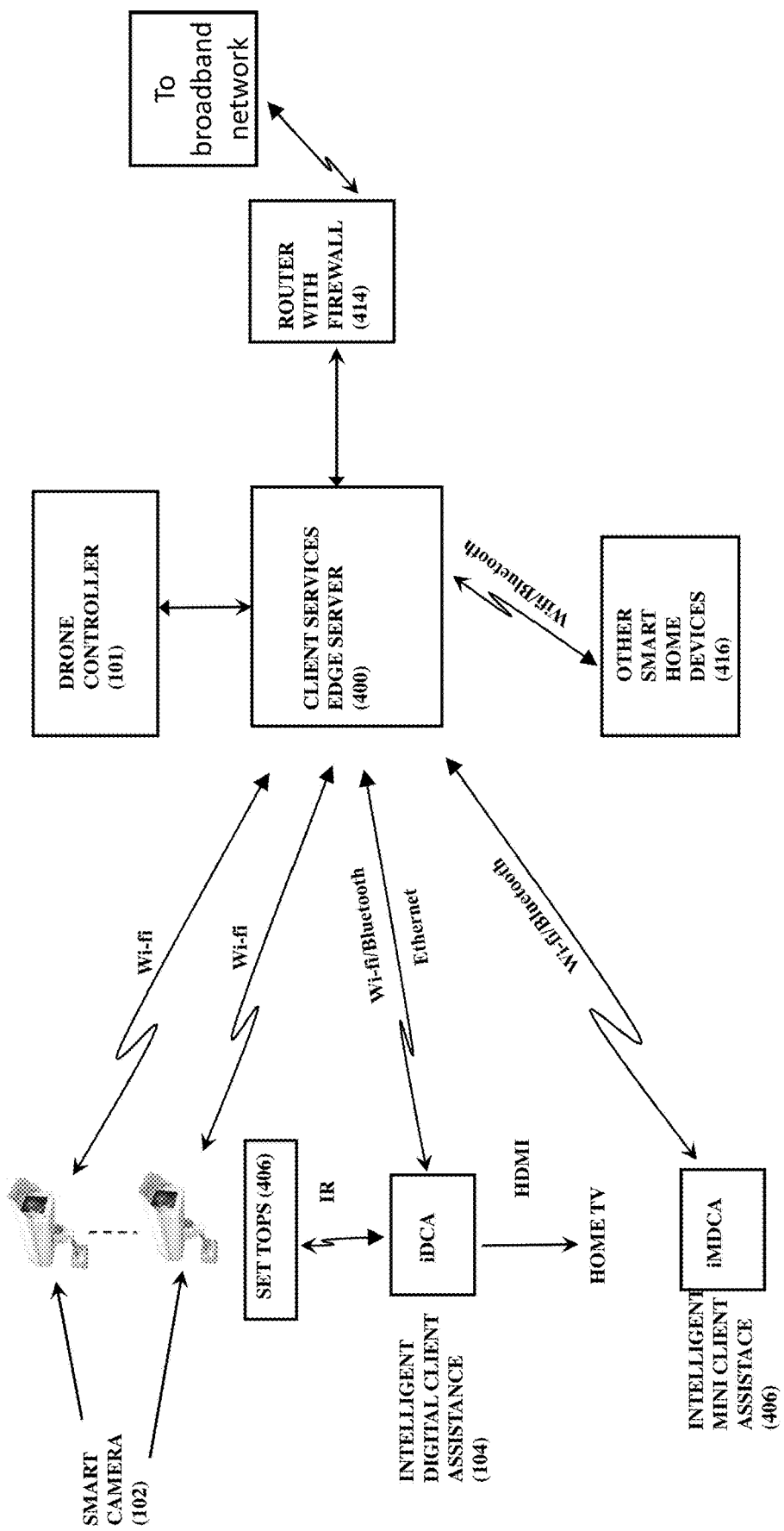
FIG. 4 AI and alert functions of intelligent device implemented on a client Services edge server.

FIG. 3 of the invention gives the list of services the system in the invention is envisioned to offer. Additional services can be added as needed. These services are geared to provide client, and its family members a worry free full services managed care to enhance quality of life for the client as well as peace of mind to the caregiver. Some of the client specific services and functions can be off loaded from web-server (140) to an Edge based Server (400) as shown in the FIG. 4 of the invention. Edge Server can monitor all the alerts from intelligent camera (102), and intelligent Digital Assistant (104), and reduce traffic going to the server (140). All the AI based applications can be executed in the edge servers to make smart camera's electronics simpler.

Figure 5:
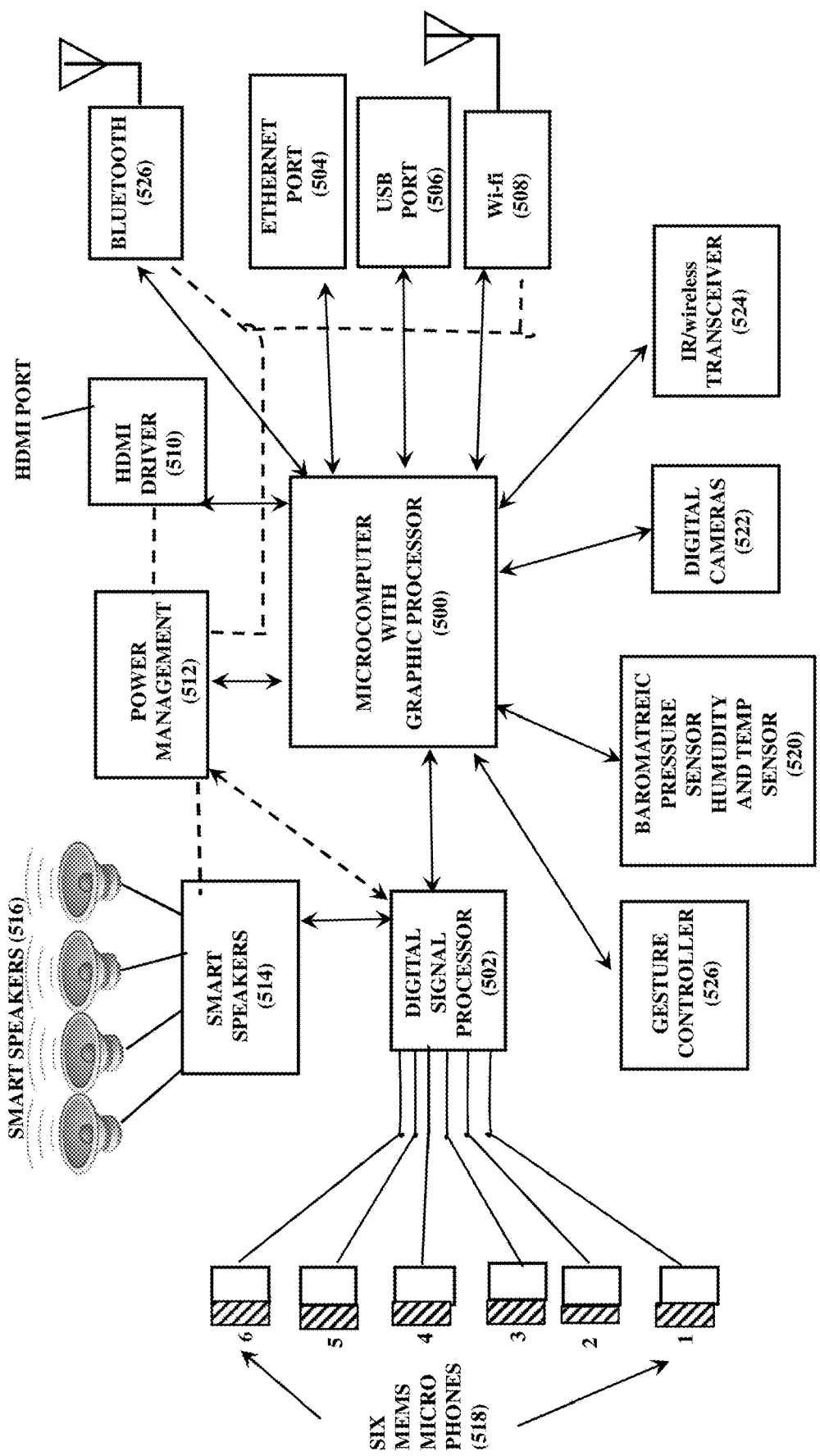
FIG. 5 Block diagram of an intelligent digital client assistant of the invention.
Figure 6:
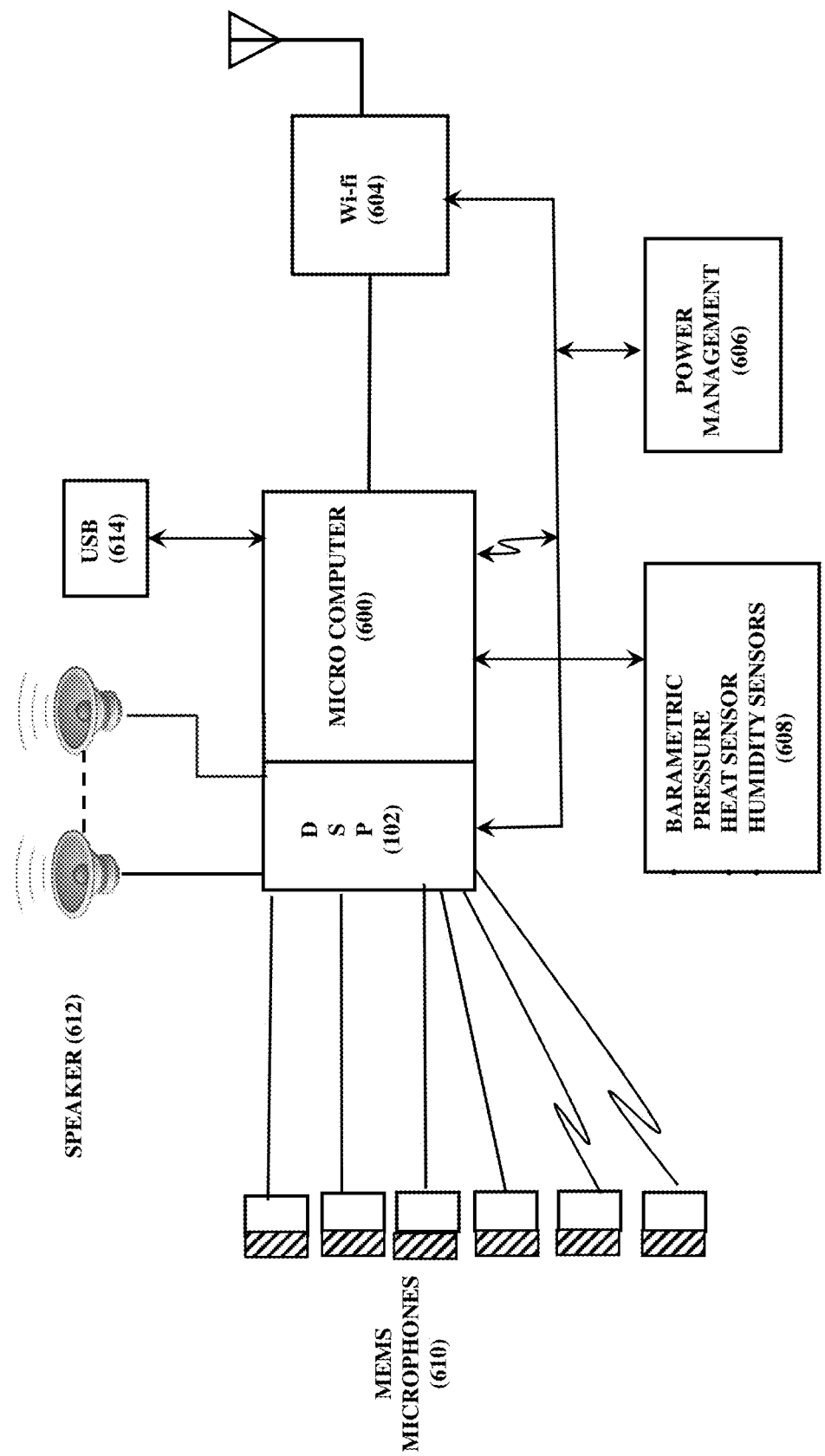
FIG. 6 A pared down version of intelligent digital client assistant.

FIG. 5 of the invention gives details of the intelligent Digital Client Assistant, (104) described earlier. The heart of this device is a microcomputer with graphic processor (500). It controls all the peripherals attached to it. The device has a built in barometric pressure sensor with temperature and humidity sensing (520). This is used to detect change in atmospheric pressure to detect open/close operation of a door, where this unit is placed. It can monitor room's temperature and humidity to help in assessing if the place is flooded or under fire, in addition to AI based scene detection by the camera. The Digital Camera (522) is used for video conferencing. The IR/wireless (524) transceiver is used to program set-top boxes like, cable TV, Apple TV, Roku etc. The wi-fi module (505), the Bluetooth module (526) is used to connect and control other smart home devices and medical devices. An Ethernet Port (504) is used to connect to the Router (103), connected to broadband internet. The USB Port (506) is used to connect USB devices. The HDMI (510) port is used to connect to the client's TV. The Digital Signal Processor (502) in the invention does beam forming for the eight MEMs microphones, (518), and provides speaker independent recognition of keywords. It also controls the smart speaker (514) to provide best sound to the location client is situated. The Gesture Controller (526) is used to assist the client with speech impairment to communicate with server through iDCA (104). Power management module (512) manages sequencing of power for all the devices. All the embedded firmware in the device is loaded or modified remotely. FIG. 6 shows a pared down version of the iDCA (104) and termed as imDCA.

Figure 7:
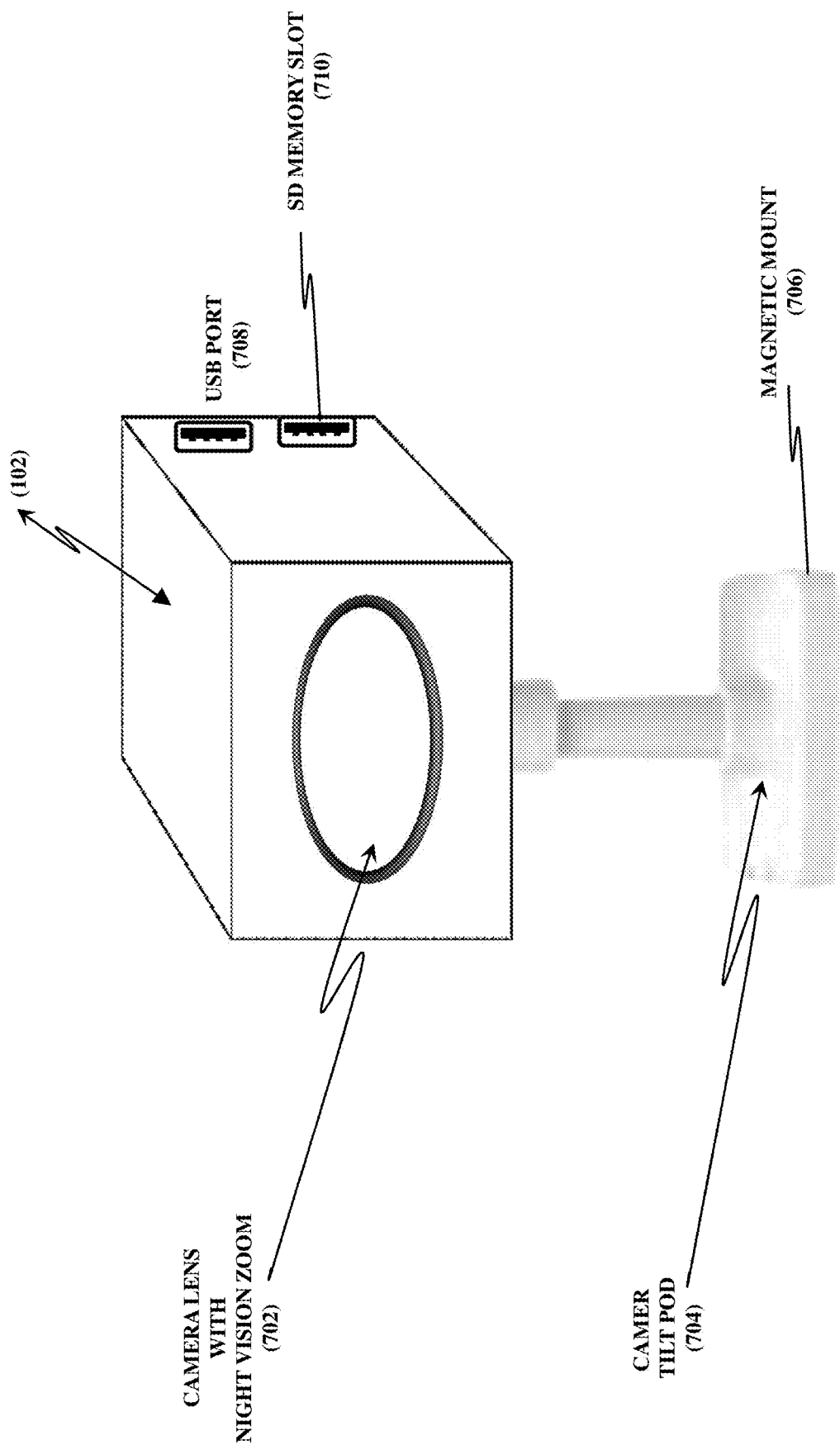
FIG. 7 Sketch of the intelligent digital camera of the invention.
Figure 8:
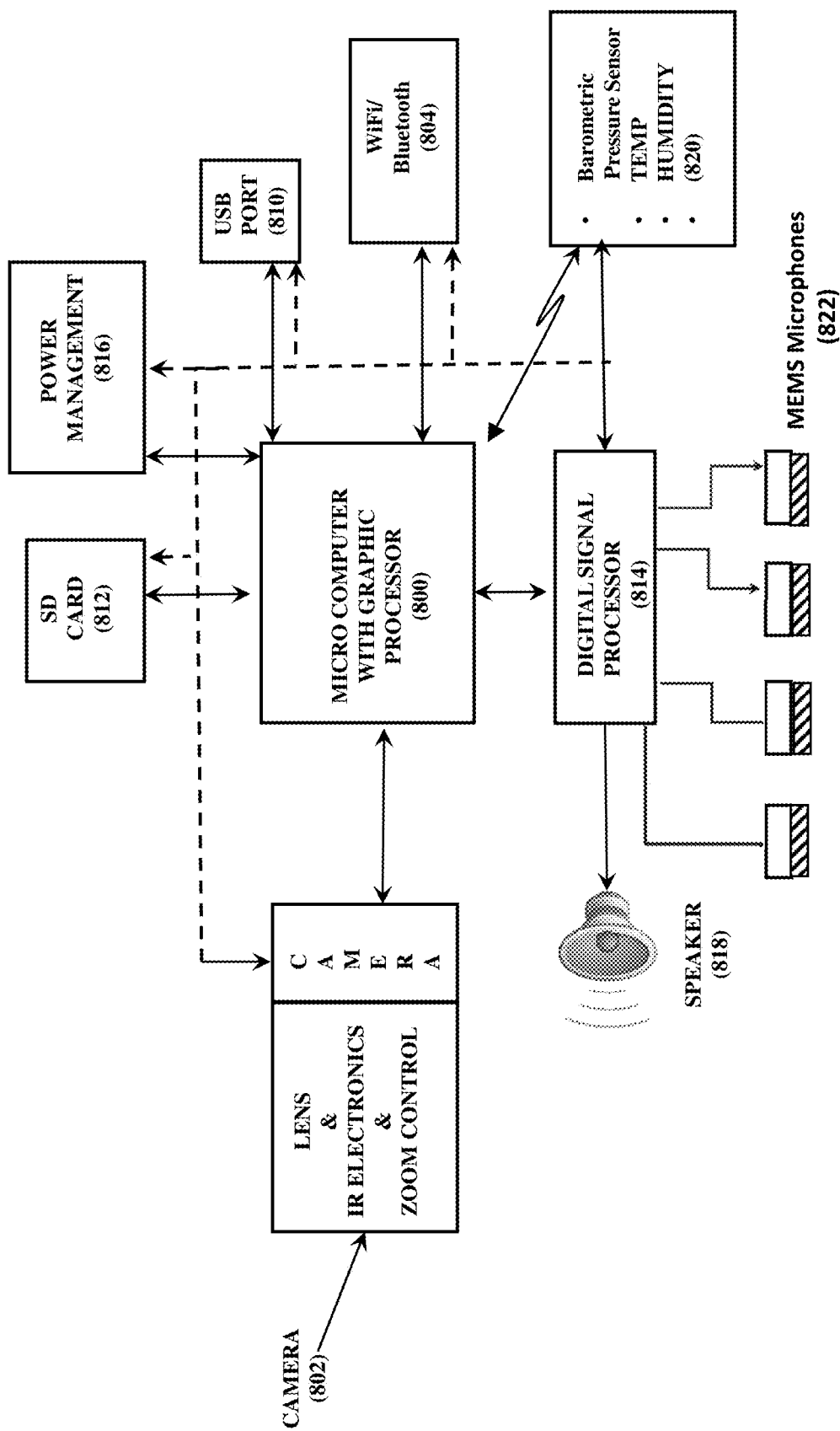
FIG. 8 Block diagram of the intelligent digital camera in the invention.

FIG. 7 of the invention gives a pictorial view of the intelligent Digital Camera, iDC (102). The camera lens with the night vision and zoom electronics (702) is mounted in a rectangular body with a slot for USB Port (708), and SD memory (710). The FIG. 8 of the invention gives details of camera electronics. A microcomputer with graphic processor (800) is used to control all the peripherals and execute AI based algorithms to recognize client's face, emotions, movement, position—i.e. sitting, lying, standing or fall from the video. The video is recorded in the SD memories while detected information is sent to the server (140) as alerts. The barometric pressure sensor (820) is also used to detect client's movement and alerts sent to the server. It gives server additional movement information to ascertain client's movement and fall. This prevents false alarms to the caregiver, and to any outside agency assistance if needed. The barometric sensor (820) can detect temperature and humidity to detect any fire and flooding. The DSP (814) is used for microphone beam forming and keyword recognition and speaker control. The power management module (816) is used to power cycle all the devices. The CMOS camera chip with lens, IR electronics & zoom control (802) is used for video capture, AI based neural network deep learning algorithms are used to implement all the video recognition features. USB port (810) is used to download all the pictures for scene analysis like fire, flood, lake and etc. for camera to send alert upon detection. These scenes can also be loaded or modified from the server (140). The Camera holds the video clip for the whole day activity, and then uploads them to the server (140) for it to use in deep learning of client's behaviors and further assist in the well-being of the client. The DSP (814), is used for processing beamforming signals from MEMS microphones (822), speaker independent keywords recognition, and speaker (818), control.

What is claimed is:

1. A Web Server based system for Alzheimer, Dementia, Autistic, and Senior clients, the system comprising:

an intelligent digital camera with artificial intelligence in a client's residence to detect the client's face, emotions, movements, habits, and hazards, with wireless network connectivity comprising;
- a digital camera with night vision electronic,
- a barometric pressure sensor to further confirm the client's activities,
- a temperature and humidity sensor to further confirm hazards conditions,
- a set of beam forming multiple Micro Electro Mechanical System (MEMS) microphones for voice listening,
- a set of smart speakers,
- a digital signal processor configured to process and recognize keywords from the client's voice,
- a microcomputer with graphic coprocessor and secured digital (SD) memory card for client's data and video storage, embedded communication with the system's remote Web Server comprising; firmware that controls applications of the intelligent digital camera including two way communication with the system's remote Web Server;

an intelligent digital client assistant at the client's residence to provide client entertainment, wherein the intelligent digital client assistant comprising
- a digital camera, a barometric pressure sensor, a humidity sensor, and
- a temperature sensor,
- a High Definition Multimedia Interface (HDMI) interface to connect to a TV,
- a set of beam forming multiple MEMS microphones,
- a set of smart MEMS speakers,
- a gesture controller,
- a plurality of wireless interfaces,
- an Infra Red (IR) transceiver, wireless connectivity and network ports,
- a digital signal processor configured to recognize spoken keywords, and control smart speakers,
- a microcomputer with graphic coprocessor with embedded firmware to control applications running on the intelligent digital assistant including communication with the system's remote Web Server;

a drone station with a client's face tracking drone, wherein the drone includes face recognition, follows the client and transmits the client's position to the system's remote Web Server;

at least one remote Web Server connected to Internet and configured to handle client and caregiver applications and includes authentication using digital face and age, digital voice and finger print recognition, and password with one time password matching, wherein the at least one remote Web Server is further configured for voice and video conferencing, virtual reality video streaming, voice and video text, email messaging and text alerts, and manages the client's residence intelligent digital cameras, intelligent digital assistants and alerts originating from the intelligent digital cameras, intelligent digital assistants, and further manages map addresses of the clients residence, the client's movement transmitted by the drone, and the at least one remote Web Server manages alert to launch the drone upon receiving alert, and maps client's movement, and alerts caregiver and authorities, and
the at least one remote Web Server provides services used by the clients comprising billing and payment services, data analytic on the client's daily alerts, client assistance operators, drone pilot operators, and communications with emergency services;

a database system to store, retrieve, archive data associated with the client's care;

wherein the caregiver application is configured to run on a smartphone, a tablet, a laptop or a desktop and allows a caregiver to monitor the client at the residence or a remote location by connecting with the at least one remote Web Server;

wherein the client application is configured to run on a smartphone, a laptop or a desktop and allows client to connect with at least one remote Web Server; and wherein applications of the client assistance operator and drone pilot operators are configured to run on a laptop, a desktop or a tablet.

* * * * *